CURRENT TRANSLATING SYSTEM WITH SEMI-CONDUCTING P–N JUNCTION RECTIFIERS

Willi Mosch and Gert Thiele, Berlin, Ernst Paul, Berlin-Charlottenburg, and Rudolf Zabel, Berlin-Gatow, Germany, assignors to Siemens-Schuckertwerke Aktiengesellschaft, Berlin-Siemensstadt, Germany, a corporation of Germany Filed Jan. 23, 1958, Ser. No. 710,685

Claims priority, application Germany Jan. 25, 1957

15 Claims. (Cl. 321—14)

Our invention relates to electric systems for translating electric currents by means of semiconducting valve devices of the p–n junction type and, in a more particular aspect, to multi-phase systems for rectifying or inverting purposes.

Such p–n junction devices, also called broad-area rectifiers, operating as transistors or half-wave rectifiers, are usually provided with a semiconductor body of crystalline germanium or silicon. They are capable of carrying high currents, for instance for power purposes, while requiring relatively little space; but care must be taken for good dissipation of the heat losses, which due to the high current intensity occur already under rated normal operating conditions. However, in contrast to other types of dry rectifiers such as selenium rectifiers, the semiconducting p–n junction devices have only slight heat-storing capacity. Hence they are more readily susceptible to damage due to excessive heat caused by electric overloads. A damaged valve member may form a short-circuit detrimental to other components of the translating system. Particularly the other semiconductor members cooperating with a damaged one within the same multi-phase system may also be affected by the damage.

It is an object of our invention to obviate such deficiencies.

According to our invention we provide a current translating system of the above-mentioned type with sensing means that respond to given operating conditions of the system load circuit apt to cause overloading of the p–n junction semiconductor members, and we connect these sensing means with a current reducing device which, when the operating condition of any one of the semiconductor members tends to become dangerous to that member, operates to limit the current in all semiconductor members of the system to a permissible value.

According to a more specific feature of our invention, the condition-responsively released device for reducing the current duty upon the semiconductor members comprises a normally open switch which, when released, electrically bridges or shorts the semiconductor members.

According to another feature of the invention, the device comprises a current reductor series-connected in the load circuit of the system either on the current-supply side or on the current-output side, or on both sides, the reductor being effective, when released, to reduce the flow of current through all semiconductor valve members of the system to a permissible value.

The above-mentioned bridging or short-circuiting for protection of the semiconductor members may be effected in various ways. One way is to effect the shunting on the feeding (current-input) side of the semiconductor units. In this case, the electric power can no longer reach the semi-conductor members. Another way according to the invention is to have each of the semiconductor valve units individually short-circuited or shunted at its electric terminals so that the valves or valves of this unit are short-circuited. According to another feature of our invention both above-mentioned ways of shunting the semiconductor valves are used simultaneously in one and the same system.

It is further preferable to combine the bridging or short-circuiting of the semiconductor valves with a simultaneous disconnection of the current supply to the system. As a result there also occurs a reduction of the load imposed upon those components of the system equipment, or of the load or distribution line connected thereto, as might otherwise become subjected to overload as a result of the above-mentioned bridging of the semiconductor members. For example, the power supply transformer of the translating system and any series-connected control and regulating devices, which otherwise would have to be rated for the increased current-carrying duty resulting from the protective bridging operation, are relieved of such increased duty and hence need be rated only for the relatively short-lasting stresses that may occur from such abnormal operating conditions.

The causes of disturbance that may excessively overload one or more of the semiconductor members may be classified as internal faults and external faults. Internal faults are those that occur at the semiconductor members themselves and may result particularly in depriving a semiconductor member of its blocking ability in the inverse direction thus forming a short-circuit relative to other semiconductor members of the translating system. External faults are those that may occur in the system equipment outside of the semiconductor members either on their input side or in the output circuit energized through the semiconductor members.

Any such faults may be sensed and responded to, for bridging the semiconductor members or actuating the above-mentioned current reductor, in one of the following ways. The protective bridging or current-reducing device may be released in dependence upon the occurrence of overload currents in one of the supply leads to the group of semiconductor valve units. In multi-phase systems, it is necessary for this purpose to provide an overload responsive sensing device in each of the phase conductors leading to the semiconductor units.

The term "current reductor" is understood to denote a device which has a normally closed switch contact connected in parallel to an electro-positive resistor, so that when the contact opens, the current commutates from that contact to the resistor, whereafter the resistance value of this resistor increases to such an extent that the current flowing through the semiconductor valves of the system is reduced at least to a value permissible for these valves or even down to a smaller value which may practically be negligible or zero. Such a current reductor may be designed, for example, by connecting a fuse in parallel to the normally closed switch contact, this fuse being so rated that when the current commutates from the switch contact to the fuse, only a negligible initial voltage can occur at the opening contact which cannot result in excessive electric stresses upon the widening gap of the switch. The thermal characteristic of the fuse, that is the value of $\int i^2 .dt$, wherein $i$ denotes the current flowing through the fuse as a function of the time $t$, must be so chosen that the switch contact reaches an opening position at which no arc can be ignited before the fuse conductor has reached its melting temperature and interrupts the circuit within the fuse.

The occurrence of overload in the translating system, resulting in damage to one or more of the semiconductor members, may be accompanied by an abnormal and excessively large current flow in the blocking direction of one of the semiconductor valves. According to another feature of our invention, therefore, the translating system is equipped with sensing means that respond to the occurrence of reverse current flow through one of the valves and then control the above-mentioned bridging or current-reducing device. In contrast to the above-mentioned overload-responsive means, a reverse-current sensing device may respond to much lower amounts of excessive current values immediately after the current reverses its direction. As a result, a very effective and sensitive supervision of the translating system and a correspondingly reliable protection of the semiconductor valve members are obtained.

Another way, according to the invention, for responding to system disturbances that may result in overloading of other valves, is to sense the blocking voltage (inverse voltage) at the respective semiconductor members. When one of the members is damaged so as to become shorted, the inverse voltage of this member breaks down. This phenomenon can be used advantageously for the purposes of our invention. Such response to the inverse voltages at the individual semiconductor members or units is particularly favorable in combination with the above-mentioned other protective devices, if the valve unit in each phase circuit comprises several semiconductor members in series-connection. Such a series-connection may be required for sustaining a rated voltage higher than the voltage which a single semiconductor member is able to withstand. A series-connection of valves within a single line or phase may also be chosen for reasons of safety, giving each individual semiconductor member a voltage rating sufficient for withstanding the occurring voltage maximum. Then, when one of the component semiconductor members drops out, the other member or members in the same line or phase remain capable of maintaining proper operation of the translating system until such time as it is more convenient to replace the damaged semiconductor component.

In this case, according to another feature of our invention, each individual semiconductor member in the group of series-connected members is provided with its own parallel-connected sensing means which, when that semiconductor member drops out, acts at least as a means for indicating the damage. According to a further feature, such a system is so designed that the current-reducing protective device is placed into operation only when both or all series-connected semiconductor members in the same phase become damaged.

The above-mentioned sensing devices for releasing the current-reducing device are preferably connected ahead of the semiconductor valves, i.e. on the feeder or input side thereof. For this purpose, auxiliary resistors may be connected in the input-side supply leads, and the voltage drop occurring across these resistors due to overload is then available as a releasing signal. Instead of such resistors, a current transformer may be used in each supply lead so as to provide a voltage which, in the event of excessive current, releases the current-reducing device as well as any additional cut-off switch on the feeder side of the semiconductor valves or in the primary circuit of the power-supply transformer.

In multi-phase rectifying systems, the sensing means for automatic release of the current-reducing device may also be connected in the direct-current output circuit common to all semiconductor valves of the system. An overload responsive sensing device in this circuit responds to operating conditions detrimental to the semiconductor valves, that are due to overloading caused by the direct-current load. It is therefore preferable in some cases to additionally provide overload-responsive sensing means in the individual lines or phases ahead of the semiconductor valves or behind them. Analogously, it is also within the purview of our invention to provide a multi-phase system with the above-mentioned reverse-current or inverse-voltage sensing devices in the individual lines or phases, together with an overload or reverse-current sensing device in the common output circuit of the load being energized, all those sensing means operating upon the same current-reducing device so as to reduce or interrupt the current flow to all semiconductor valve units in response to any one of the various faults responded to.

The foregoing and other objects, advantages and features of our invention will be apparent from, and will be mentioned in, the following description of the embodiments illustrated by way of example on the accompanying drawings, in which the thirteen figures illustrates the schematic circuit diagrams of three-phase rectifier systems in respectively different modifications, the same reference characters being used in all illustrations for functionally similar components respectively.

Figure 1:
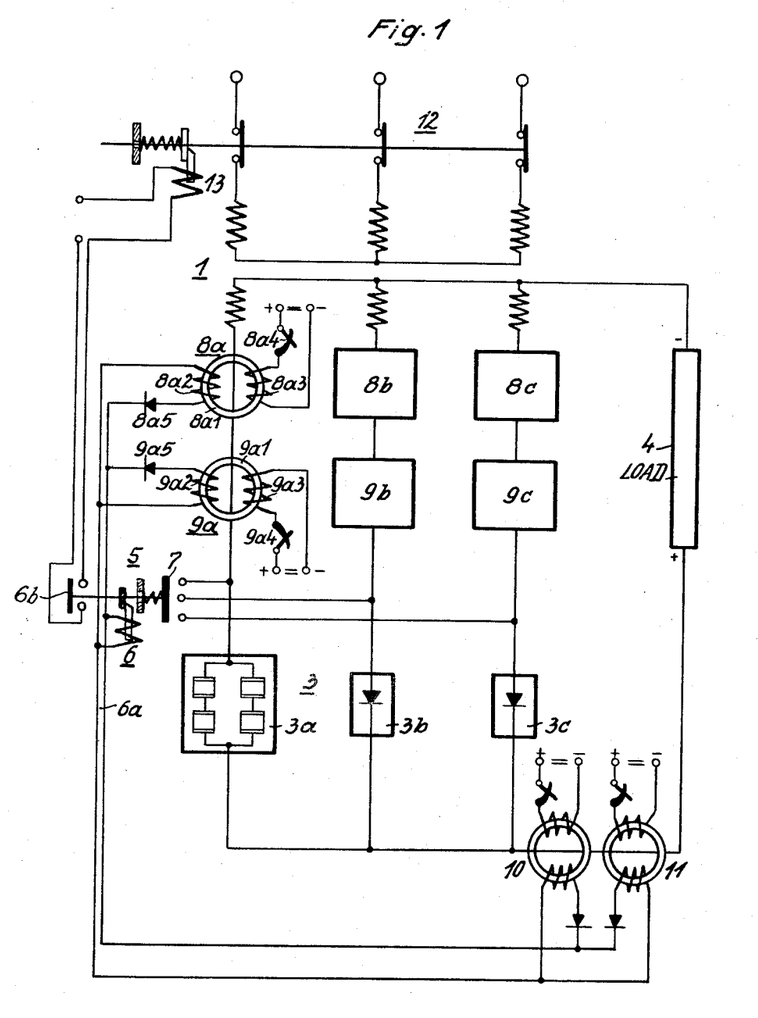

In the three-phase rectifier system according to Fig. 1, the three phase windings on the secondary side of a transformer 1 are connected to a set of rectifier units 3 for energizing a load 4 with direct current. The rectifier set 3 comprises three individual units 3a, 3b, 3c, each being series-connected in one of the respective phase circuits. The unit 3a is shown to comprise a series-parallel arrangement of four half-wave rectifiers of the p-n junction type, the semiconducting body of each member consisting of germanium or silicon. The rectifier units 3b and 3c are shown symbolically only, it being understood that their design is identical with that of the more fully illustrated unit 3a.

The system is provided with a current-reducing device 7 which in this embodiment is designed as a normally open switch. When the switch is released by its electromagnetic releasing device 6, it closes its contact 7 which then forms a short-circuit across the alternating current input leads of the three rectifier units.

Connected in series with each individual input lead between transformer 1 and rectifier set 3 is an overload-responsive sensing device 8a, 8b, or 8c. The device 8a comprises a saturable-core transformer. The annular core 8a1 of the transformer surrounds the phase lead which thus forms the primary circuit. The core carries a secondary winding 8a2 and a premagnetizing winding 8a3 which is energized from a direct-current source of constant voltage through an adjustable calibrating resistor 8a4. The secondary winding 8a2 is connected through a valve member 8a5, such as a dry-type half-way rectifier, to the control circuit 6a of the switch release coil 6.

As soon as the current flowing in the phase lead exceeds a given overload value, it overcomes the adjusted premagnetization of the transformer core so that the core abruptly reverses its polarity of magnetizations, thus inducing a voltage pulse in the secondary winding 8a2 which triggers the switch 5. For securing this effect, the transformer core 8a1 is made of a ferromagnetic material of a parallelogram-shaped or substantially rectangular characteristic.

The overload-sensing devices 8b and 8c, shown symbolically only, have the same design and operation in the above-described device 8a and are also connected to the switch-release control circuit 6a.

Further connected in series with each of the rectifier units are respective reverse-current sensing devices 9a, 9b, 9c. As is shown in detail for device 9a, each of the latter three devices comprises a saturable core transformer designed and connected as described above with reference to overload sensing device 8a. However, the valve member 9a5 is so poled as to be non-conductive when the current in this particular phase flows in the forward direction. While, as mentioned, the overload devices 8a, 8b, 8c are set for response to a given high value of excessive overload, the reverse-current devices 9a, 9b, 9c are rated and premagnetized for response to a much lower magnitude of reverse current and hence may respond to reverse current below the rated current value of the system.

The illustrated embodiment is further provided with an overload-responsive sensing device 10 and with a reverse-current sensing device 11 which are both connected in serial relation to the load 4 in the direct-current output circuit of the system. The design, connection and operation of devices 10 and 11 correspond to the overload sensing device 8a and the reverse-current sensing device 9a described in the foregoing.

It should be understood that each of the rectifier units 3a to 3c may be provided with only a series connection of junction rectifiers, or only with an individual junction rectifier member. Furthermore, not all of the above-described sensing devices need be used. In certain cases, only an overload responsive sensing device or only a reverse-current sensing device may be provided in each of the individual phase circuits, and only one of the two sensing devices 10, 11 may be provided in the direct-current output circuit.

The sensing devices 8a to 8c and 9a to 9c have the above-explained function of supervising the system for internal faults occurring at the semiconductor valves and simultaneously also for external faults as may occur in system components or the load located behind the rectifier units relative to the input transformer.

In such a system, it may happen, for instance, that one of the rectifier units, such as the unit 3a, loses its blocking ability. Then the two other rectifier units 3b and 3c operate upon a short circuit formed by the unit 3a. Consequently, these two other units would be overloaded. However, in the illustrated system, the overload currents in the phase leads of units 3b and 3c cause the overload responsive devices 8b and 8c to operate, so that the short-circuiting switch 5 is released by coil 6. In conjunction with the above assumed short circuit in rectifier unit 3a, there also occurs a reverse current in the phase lead of unit 3a. Consequently, the reverse-current sensing device 9a will also respond to release the switch 5. Hence the system secures utmost reliability because the response of any one of the activated sensing devices suffices to effect closing of the switch 5. The switch 5 then cuts the current supply from the transformer 1 to all semiconductor units 3 so that the units 3b and 3c, still in sound condition, are protected.

The supply of power to the primary windings of the transformer 1 is likewise controlled in dependence upon the conditions responded to by any one of the above-described sensing means. For this purpose, the primary circuit of transformer 1 is provided with a normally closed circuit breaker or other switching device 12 whose release coil 13 is energized by a normally open contact 6b of the current reducing switch 5 as soon as this switch closes.

The overload sensing devices 8a to 8c may be rated or adjusted to respond to an overload current which, though substantially above the normal rated load of the rectifier system, is still below the order of magnitude of a short-circuit current. As further mentioned, the devices 9a to 9c and 11, responsive to flow of reverse current, are preferably rated to respond to a much smaller current value. Such a reverse current can be reliably responded to even when its amount is small in comparison with the rated operating current of the system.

Figure 2:
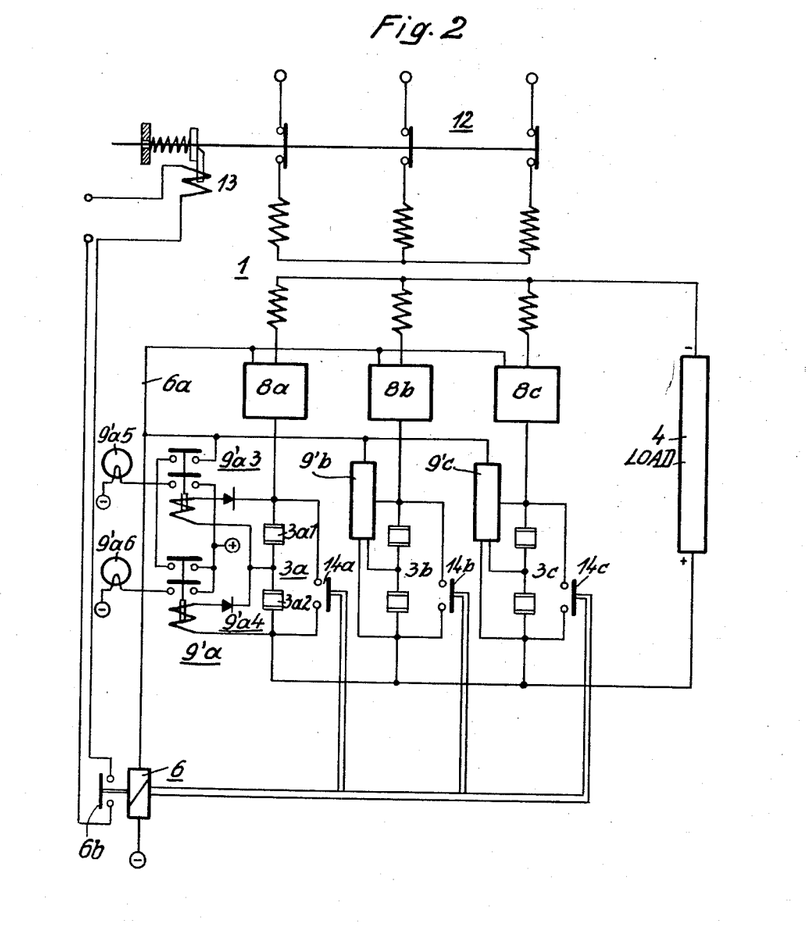

The embodiment of a three-phase rectifier system shown in Fig. 2 is generally similar to that of Fig. 1, as is apparent from the corresponding reference characters. The essential differences from the system of Fig. 1 are the following.

While in Fig. 1 the current reducing device 5 has its short-circuiting contact 7 so connected as to bridge the feeding sides of the semiconductor units, the corresponding device 7 in Fig. 2 is provided with three bridging contacts 14a, 14b, 14c which individually short-circuit the semiconductor units 3a to 3c as soon as the releasing coil 6 is energized in the manner described above with reference to Fig. 1.

Instead of the reverse-current responsive devices 9a, 9b, 9c described above with reference to Fig. 1, the system of Fig. 2 is provided with inverse-voltage responsive means 9'a, 9'b, 9'c in the three respective phases. Furthermore, each of these sensing means has two components, such as those denoted by 9'a3 and 9'a4, so that each individual semiconductor member 3a1 and 3a2 has its own sensing device. In the present case the two sensing devices 9'a3 and 9'a4 consist each of a relay whose coil is connected across one of the respective semiconductor members 3a1 and 3a2, in series with a half-wave rectifier so poled that the two relays are subjected to the inverse voltages of the two members and are normally kept picked up by those voltages. When one of the semiconductor members is damaged so that its inverse voltage breaks down, the one affected relay drops off and closes its contacts and lights a signal lamp 9'a5 or 9'a6 to indicate trouble so that the system can be shut down at the next convenient time, it being assumed that each of the members 3a1, 3a2 is rated for temporarily carrying the entire voltage in its phase. However when both relays 9'a3 and 9'a4 respond, they jointly connect the source of control voltage to the line 6a and thus cause the releasing device 6 of the short circuiting switch to operate. The coil circuits of the two relays are high-ohmic in order not to interfere with the operation of members 3a1 and 3a2.

The sensing means 9'b and 9'c in the phase circuits of the rectifier units 3b and 3c are shown only symbolically, as they have the same design and operation as the device 8'a described with reference to rectifier unit 3a.

Figure 3:
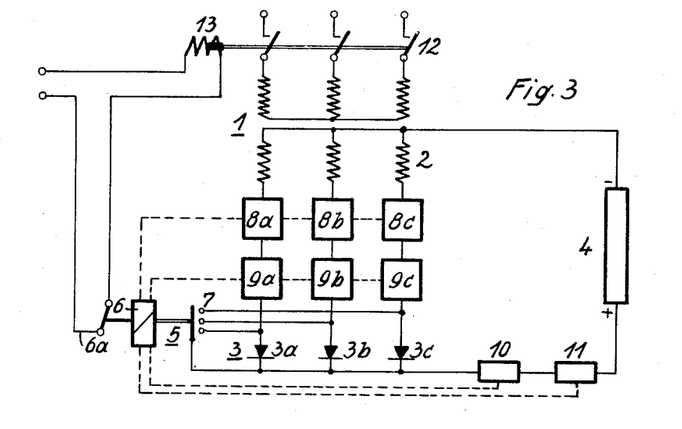

The embodiment illustrated in Fig. 3 exhibits a modification in a rectifier system which otherwise may correspond to those described above with reference to Figs. 1 and 2. According to Fig. 3, the protective device 5 is so connected that its response causes not only bridging of the phase leads on the feeder side of the semiconducting rectifier units 3a, 3b, 3c, but also a direct short-circuit across each individual rectifier unit.

According to the circuit diagrams of Figs. 1 to 3, the semiconductor units are interconnected in zero-point or star (Y—) connection. As mentioned, the invention is analogously applicable for other types of circuit connections, particularly rectifier bridge networks wherein semiconductor units are located in the branches of network.

Figure 4:
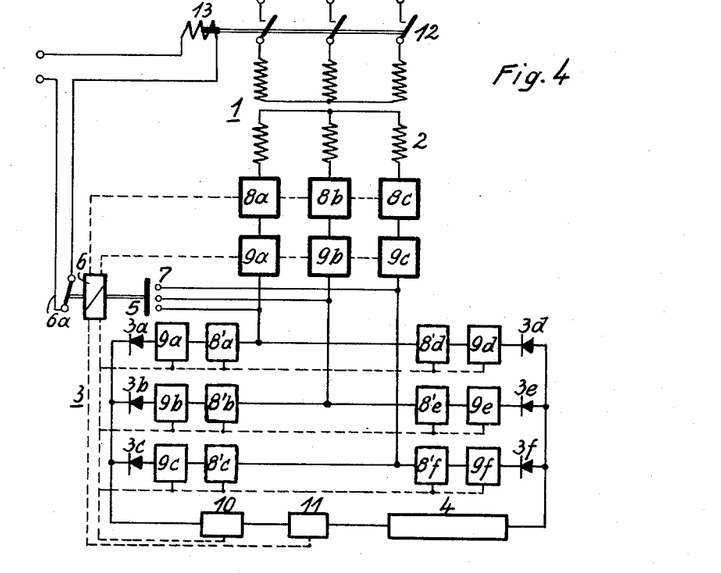

Such a system is exemplified by the rectifier circuit diagram of Fig. 4. The embodiment is essentially a three-phase bridge network with six p–n junction devices 3a to 3f, all shown symbolically only. In such a system, the overload-responsive devices 8a to 8c may be connected in the common feeder lines leading from the power input terminals or transformer to the bridge input points, whereas preferably a reverse-current sensing device 9a to 9f is connected in each individual branch of the bridge network in series with the respective rectifier units. In lieu thereof, or in addition thereto, the overload-responsive devices may also be connected in each of the respective bridge branches in series with the semiconductor units. In Fig. 4 such additional overload-sensing devices are denoted by 8'a to 8'f. It will be understood that, when the devices 8'a to 8'f are provided, the sensing devices 8a, 8b, and 8c in the three feeder lines may be omitted, if desired. On the other hand, a set of reverse-current responsive devices 9'a, 9'b and 9'c, as shown may further be connected in series with the supply leads of the bridge network.

Each of the condition-responsive sensing devices in the system of Fig. 4 acts upon the releasing coil 6 of a switch, while in Fig. 4 the switch is shown to cross-connect the feeder phases of the bridge network when closing it will be understood that, as previously described, the switch may instead be designed to short-circuit the individual semiconductor units in each bridge branch by respective separate contacts or to cross-connect the feeder phases and simultaneously short-circuit of each semiconductor unit.

Figure 5:
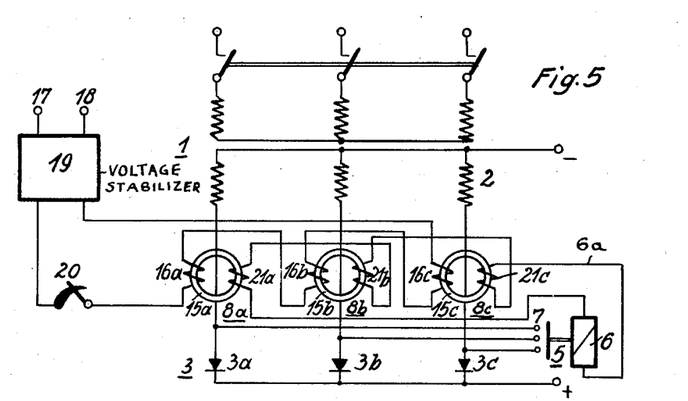

The embodiment shown in Fig. 5 illustrates an example of a rectifier system in which saturable-core transformers are used as overload-responsive devices in the respective feeder phases of the system. Each overload-sensing device 8a, 8b, 8c comprises an iron core 15a, 15b, or 15c of annular shape consisting of a ferromagnetic material whose magnetizing characteristic is as rectangular as possible. The primary winding of each saturable transformer is formed directly by the phase lead which is connected to the individual semiconductor unit and passes through the hollow center space of the iron core. The cores 15a to 15c are provided with respective pre-magnetizing windings 16a to 16c which are all connected in series and energized at terminals 17 and 18 from a common source of direct voltage, preferably through a voltage stabilizer 19 and preferably in series with an adjustable resistor 20. The secondary windings 21a, 21b, 21c are all serially connected in the control circuit 6a of the releasing device 6 in switch 5. When a predetermined amount of overload current is exceeded in any one of the supply leads to the p–n junction rectifiers 3a to 3c, the saturable transformer of this particular supply lead issues a current pulse to the releasing device 6 so that switch 5 closes its contact 7 and cross-connects the three supply leads, thus preventing all three semiconductor units from receiving further current from transformer 1.

As explained with reference to Figs. 2 and 3, the switch 5 may also be connected to short-circuit the valves 3a, 3b and 3c individually, or to effect such a short circuit as well as bridging of the three supply leads.

Figure 6:
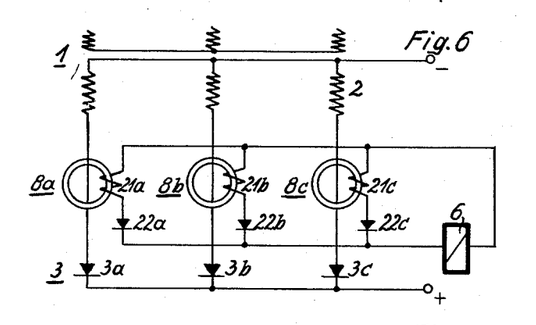

In comparison with Fig. 5, the system, only partially shown in Fig. 6 but otherwise similar to those described above, is modified in having the secondary windings 21a, 21b and 21c connected to the switch-releasing device 6 in parallel relation to each other. According to another feature of our invention, each of the secondary transformer windings 21a to 21c is individually connected in series with a half-wave rectifier 22a, 22b or 22c, preferably of the dry type, which is so poled that the current pulse produced by any one of the saturable transformers cannot pass through the secondary windings of the other transformers. This prevents the inductivity of the individual saturable transformers from detrimentally affecting the control of device 6 by imposing a time delay upon the switch-releasing operation.

Figure 7:
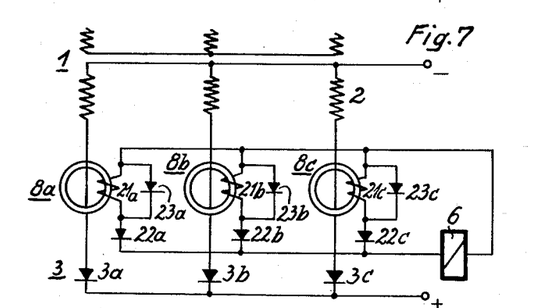

The system in Fig. 7 is further modified and improved over that of Fig. 6. In accordance with still another feature of our invention, an additional half-wave rectifier member 23a, 23b or 23c preferably also of the dry type, is connected in parallel to each of the respective secondary windings 21a, 21b, 21c of the saturable transformers. The additional rectifier members 23a, 23b, 23c to prevent the voltage at each secondary winding from rising up to an undesired high value, and thus operate as amplitude limiters for these secondary voltages.

Figure 8:
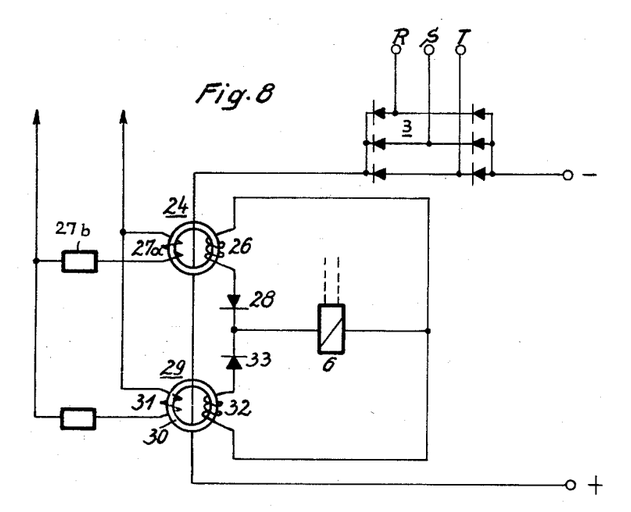

In the embodiments according to Figs. 5 to 7 the saturable transformers, operating as overload-responsive sensing devices, are located on the feeding side of the semi-conductor units. In contrast, Fig. 8 illustrates a system in which a similar overload-responsive device is connected on the direct-current side of the rectifier system. The p–n junction units, generally denoted by 3, are connected in a three-phase bridge network which is energized from alternating current terminals R, S, T. Connected in the direct-current output circuit of the rectifier system is an overload-responsive sensing device consisting essentially of a saturable-core transformer 24 whose secondary winding 26, in response to a given amount of excessive overload, issues a releasing pulse to the releasing device 6 of a current-reducing device designed and operating as described in conjunction with any of the preceding embodiments. The transformer 24 has a pre-magnetizing winding 27a connected through a calibrating resistor 27b with a source of constant direct voltage as described with reference to Fig. 5. Connected in series with secondary winding 26 is a half-wave rectifier 28, preferably of the dry type, whose purpose will be described further below.

The system of Fig. 8 is further provided with a reverse-current sensing device 29 which comprises another saturable-core transformer whose iron core 30 is provided with a pre-magnetizing winding 31 and a secondary winding 32. The secondary winding 32 is connected with the switch-releasing device 6 in series with another valve 33, preferably a dry-type half-wave rectifier. As soon as a reverse current flow occurs, a corresponding current pulse is issued by secondary winding 32 due to the voltage induced therein. This current pulse acts upon the releasing device 6 which then actuates the short-circuiting of current-reducing switch in the manner described. The valve 33 is poled to permit a flow of releasing current only in response to occurrence of reverse current. The two valves 28 and 33 further cooperate in preventing the current pulse supplied from each of secondary windings 26, 32 from passing through the other secondary winding.

It has been mentioned above that instead of the feeder-bridging or rectifier-shorting switch, a current reductor may be used for limiting the flow of current through the semiconducting members in response to various overload, reverse-current or inverse-voltage conditions. The embodiment illustrated in Fig. 9 shows schematically such a current reductor.

Figure 9:
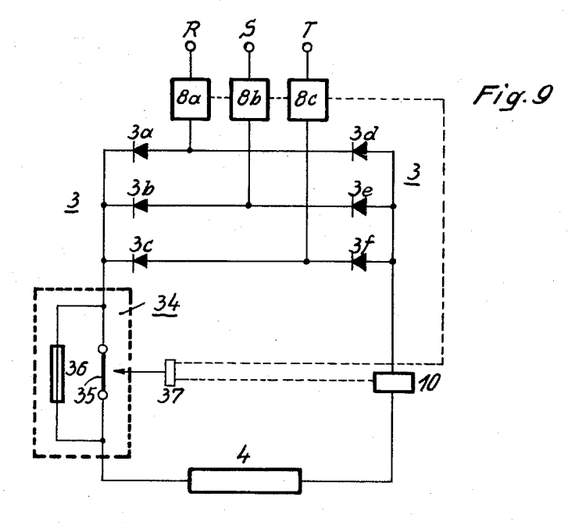

According to Fig. 9 a three-phase rectifier bridge with six semiconductor valve units 3a to 3f is energized from three-phase line terminals R, S, T and supplies direct current to a load 4. The direct-current output circuit includes a current reductor 34. Such reductors are known as such, for instance from the periodical "Scientia Electrica," vol. II, No. 2, 1956, pp. 72 to 74. According to the publication, and as described above, a current reductor consists in principle of a switch 35 and a fuse 36 connected in parallel. As soon as excessive overload current causes any one of the sensing devices 8a, 8b, 8c to act upon the releasing device 37 of switch 35, the switch opens and the current is commutated upon the fuse 36. The fuse is so rated that, before the fuse conductor increases its resistance and correspondingly reduces the current up to the point where the melting temperature of the fuse conductor is reached, the movable contact of switch 35 has reached a position in which, due to the wide gap between movable and stationary contacts, an arc can no longer be ignited across the gap. The actuation of the releasing device 37 in such a current reductor may be effected, for instance, through a group of capacitors normally kept in charged condition, which is switched upon the releasing device 37 in order to actuate the current reductor by the capacitor discharge current. Such a capacitor connection may also be used in conjunction with releasing devices for operating a short-circuiting or bridging switch in systems as described above with reference to the other embodiments. Examples of capacitive actuating devices of the type just mentioned will be described below with reference to Figs. 11 and 12.

The current reductor may also be given any other suitable design of a normally closed switch shunted by an electro-positive resistor which gradually reduces the current flow as soon as the switch is opened in response to the above-mentioned overload or reverse-current conditions.

Current reductors of the type described may also be connected on the feeder side of the semiconductor rectifier system, preferably on the primary side of the power transformer used for energizing the system. An example of such a system is illustrated in Fig. 10.

Figure 10:
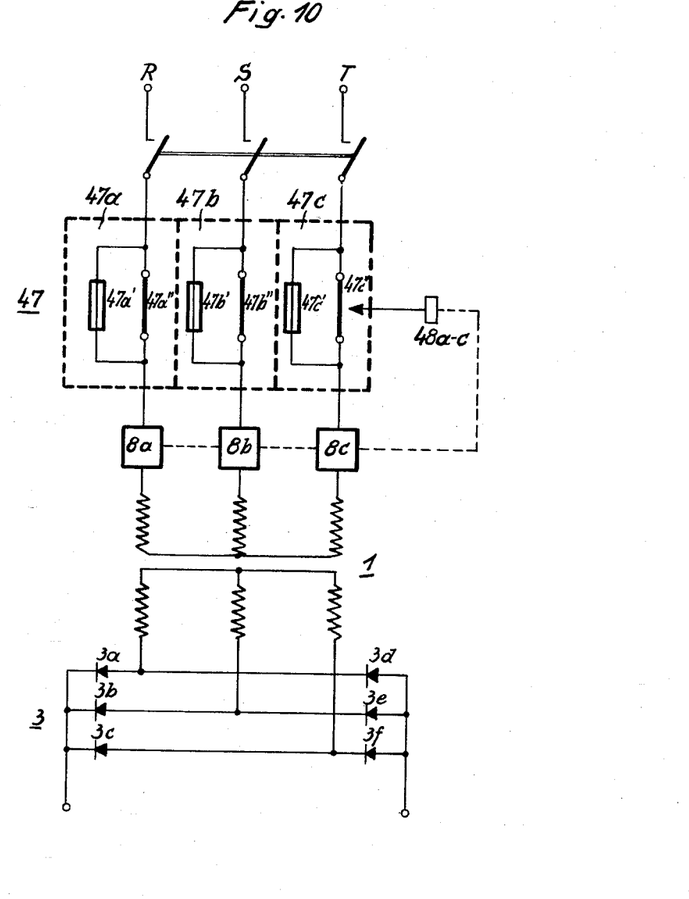

According to Fig. 10, the current reductor 47 comprises three component reductor devices 47a, 47b, 47c, connected in each of the respective power supply leads connected to the primary windings of the transformer 1. The three components of the reductor 47 are released by respective releasing devices 48a to 48c which are schematically shown connected with overload-responsive sensing devices 8a to 8c. Upon response of any one of the sensing devices, the component reductors open their respective switch contacts 47a" to 47c" thus causing the electropositive resistors or fuses 47a' to 47c' to reduce the primary current in the manner described above. It will be understood that in embodiments provided with current reductors such as exemplified by Figs. 9 and 10, the release of these reductors may also be effected in dependence upon the inverse blocking voltage across an individual semiconductor valve, or also by the combination of overload response and reverse-current response substantially in the manner described above with reference to Figs. 1 to 8.

Figure 11:
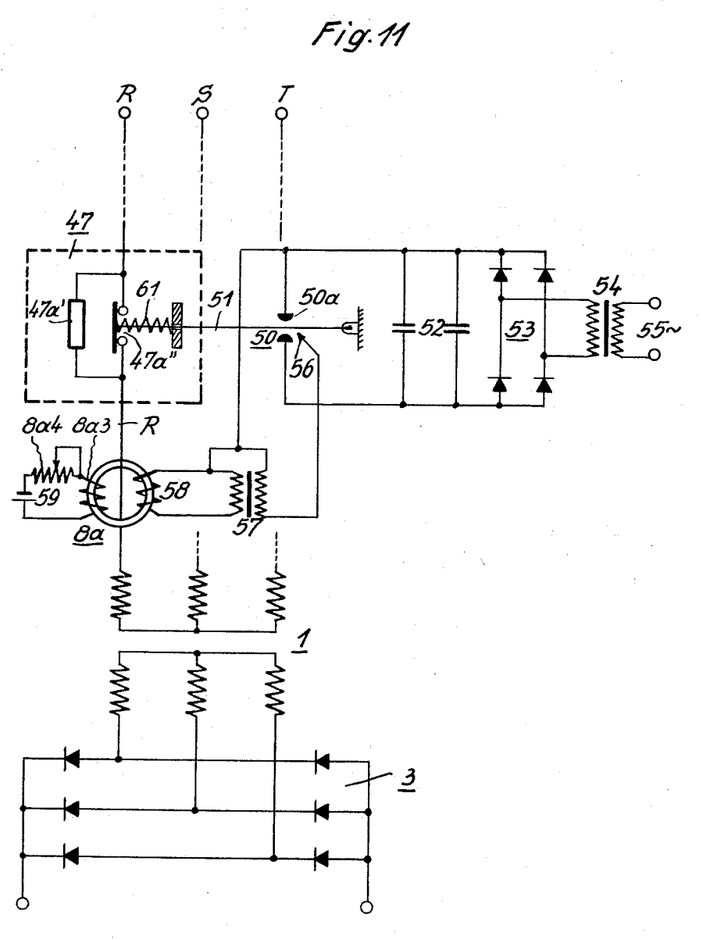
Figure 12:
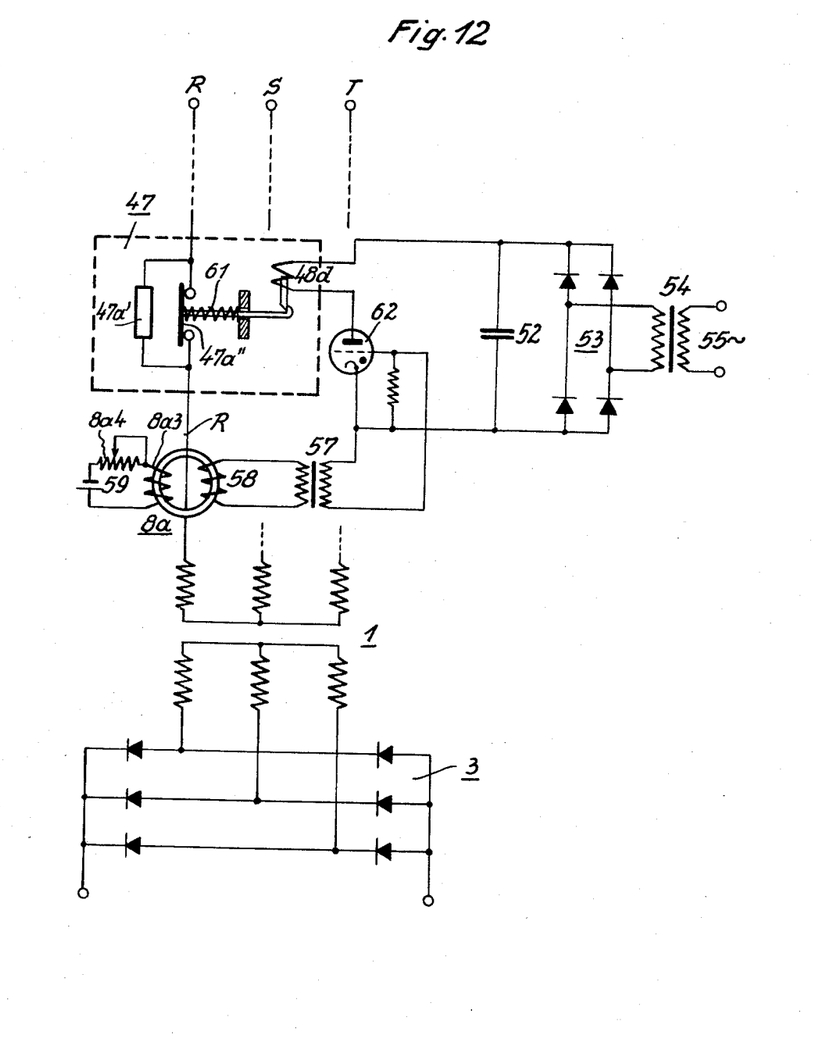

As mentioned, the current reductors in systems according to the invention may be released by capacitive discharge. Embodiments of suitable release control circuits will be described presently with reference to Figs. 11 and 12, showing respective devices applicable in a system according to Fig. 10. The release control circuit for only one phase is illustrated, as the design and operation of the other are analogous; and the reference characters in Figs. 11 and 12 correspond to those used in Fig. 10.

In the embodiment of Fig. 11, the switch contact 47a" of the current reductor 47 is biased by a kick-out spring 61 but is normally held closed by a holding wire 51. A spark gap 50 serves to destroy the wire 51 for releasing the switch contact. Connected in parallel to the spark gap 50 are one or more capacitors 52 which are kept charged from a rectifier 53 energized through a transformer 54 from alternating-current line terminals 55. The spark gap 50 is ignited by an auxiliary electrode 56 which forms a pre-ionizing gap together with the gap electrode 50a and can be excited from a transformer 57. Transformer 57 has its primary circuit energized from the secondary winding 58 of the saturable-core transformer of the overload sensing device 8a, whose primary is formed by the phase lead R. The iron core of the saturable transformer carries a pre-magnetizing winding 8a3 energized from a direct-current source 59 through an adjustable resistor 8a4.

When an excessive overload current occurs in phase lead R, the primary excitation of the saturable transformer overcomes the adjusted pre-magnetization produced by winding 8a3 so that the transformer core is abruptly magnetized in the reverse direction and a corresponding voltage pulse is induced in the secondary winding 58. The transformer 57 transmits this pulse to the auxiliary ionizing gap 50a—51 which causes ignition of the main spark gap 50. The resulting arc destroys the holding wire 51, the kick-out spring 61 opens the switch contact 47a", and the previously shorted electro-positive resistor 47a' is now connected into the phase lead R to reduce the current in the manner described previously.

In the embodiment according to Fig. 12, the switch contact 47a" of the current reductor 47 is normally kept closed, in opposition to the force of kick-out spring 61, by means of a latch which is releasable by operation of a control coil 48d. Connected in the circuit of coil 48d is a controllable electronic switching tube 62, such as a thyratron. The grid circuit of tube 62 receives trigger voltage from a transformer 57 in response to the voltage pulse produced in the secondary winding 58 of the saturable-core transformer of the overload sensing device 8a. As soon as tube 62 conducts, a discharge current flows from capacitor 52 through the releasing coil 48d so that the latch is released, and the switch contact 47a" opens and inserts the resistor 47a' into phase lead R.

Figure 13:
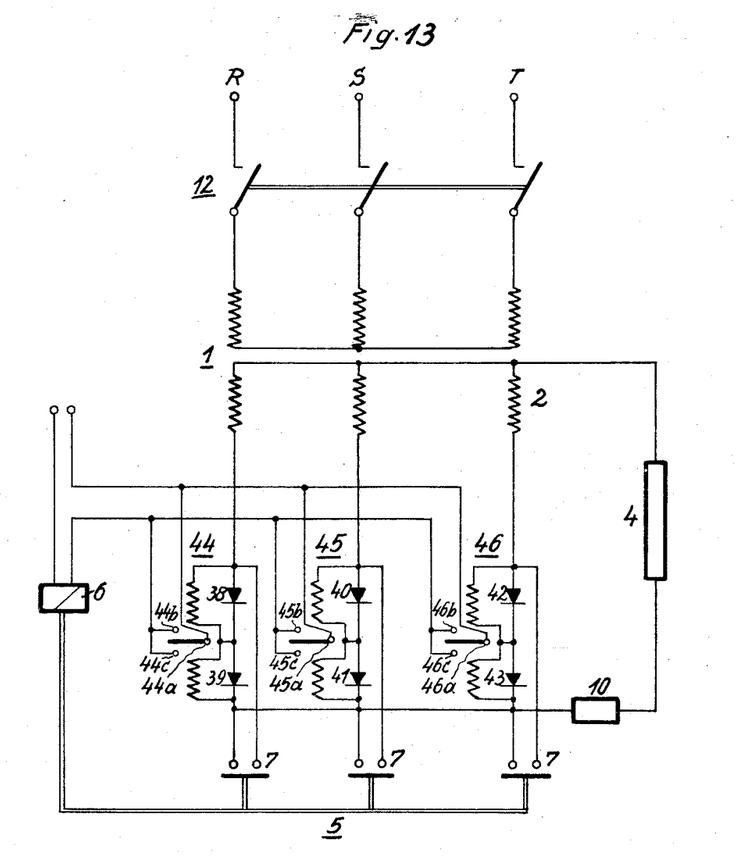

In the rectifier system shown in Fig. 13, the releasing device of a short-circuiting switch is actuated in dependence upon the breakdown an excessive decline of the inverse voltage at any one of the individual rectifier members. The system is generally similar to those described above, it being understood that the circuit breaker 12 on the primary side of the transformer 1 is also controlled by the releasing device 6 for the short-circuiting switch contacts 7 in the manner described with reference to Fig. 1. As in the embodiment of Fig. 2, each semiconducting p–n junction unit comprises a pair of rectifier members in series. The members of each pair are denoted by 38 and 39, 40 and 41, 42 and 43. A differential relay 44, 45 and 46 has its two coils connected across each of the two series connected semiconductor members of each pair. The armatures 44a, 45a, 46a of the relays are polarized. Each armature cooperates with two stationary contacts 44b, 44c or 45b, 45c or 46b, 46c. As long as the same blocking voltage obtains across the two series connected valves of a pair, the two coils of the appertaining differential relay receive the same median value of current so that the relay armature remains in mid-position. When the inverse voltage, due to damage to a semiconductor member, breaks down, the current in one coil predominates so that the polarized armature moves to one or the other side and engages one of two stationary contacts and closes the control circuit for the releasing device 6 of the short-circuiting switch whose contacts 7 then form a short circuit across each pair of the semiconductor members.

A system according to the invention, although herein particularly described for broad-area type semiconductor devices with p–n junctions for the purpose of rectifying alternating current, is similarly suitable with p–n junction devices of transistor type for direct-current to alternating-current conversion; that is, when using a system network energized from a source of direct current to supply a load with alternating current.

Short-circuiting switches have become known as such for use in mechanical rectifier or converter systems, operating with periodically movable contacts, for preventing these contacts from being subjected to electric power under conditions where arcs in the switching gap may be produced periodically. Such periodic contacts of mechanical rectifiers are usually connected in series with a saturable commutating reactor that produces a stepped current-time curve, the steps occurring in the vicinity of the current zero passages so that the mechanical contacts when opening and closing are practically not subjected to any current flow during normal operation, with the exception of a slight magnetizing current passing through the commutating reactors. During such operation the known short-circuiting switches operate in the event the above-mentioned current step produced by the commutating reactors does not have the correct synchronous phase position to the opening or closing moments of the mechanically controlled electric contacts.

In contrast, our invention does not concern itself with mechanically operating translating devices called upon to synchronously interrupt and re-close an alternating-current. The invention relates to static valve devices on the basis of semiconductors, for example germanium or silicon, operating as broad-area rectifiers with p–n junction, thus requiring no synchronism between a mechanical switching movement and the time characteristic of an electric current. No synchronous switching is involved; and the devices according to the invention operate under different conditions and for a different purpose, namely to prevent excessive heating of the static semiconductor members by excessively high load currents resulting in correspondingly increased heat losses in the junction rectifier members and causing such member to drop out and forming a short circuit apt to cause damage to the other semiconductor members in the same system.

As apparent from Figs. 1, 2 and 13, systems according to the invention may comprise a plurality of individual semiconductor members connected in parallel or in series to form an individual rectifier unit; and it is also apparent from Fig. 1 that such a unit may comprise a group of semiconductor members connected in series as well as in parallel. Such combinations of individual semiconductor elements are applicable in all other systems described herein, and it will further be understood that, if desired, each individual member of such a combination may be provided with its own condition-responsive sensing device. Instead of providing a current reductor of the type above described, comprising a fuse in parallel connection to a normally closed switching member, the current-reducing device may also consist of other resistance devices that are connected in the supply leads through the rectifier group and have zero or negligibly small resistance during normal operation, which resistance increases in the event of one of the above-described disturbances. Resistors having a positive temperature coefficient of resistance are suitable for this purpose. These resistors are normally short-circuited by a switch during trouble-free operation in the same manner as described above with reference to the fuse devices shown in Figs. 9 and 10. Upon occurrence of a condition apt to cause overheating of semiconductor member in the system, the switch is opened in the described manner so that then the electro-positive resistance member is put into operation with the effect of limiting the operating current to a permissible value.

Such and further modifications, other than those specifically herein set forth, will be obvious to those skilled in the art upon a study of this disclosure, without departing from the essence of the invention and within the scope of the claims annexed hereto.

We claim:

1. An electric current translating system, comprising a load circuit, semiconducting p–n junction rectifier means series-connected in said circuit and forming the active translating components of the system, a normally inactive current-reducing device connected with said semiconducting means for reducing, when active, the current flowing through said semiconducting means to a permissible value, and sensing means responsive to any electric load conditions in said semiconducting means due to cause overheating of said semiconducting means, said sensing means being connected to said device for actuating it in response to said conditions.

2. An electric current translating system, comprising a load circuit, semiconducting p–n junction rectifier means series-connected in said circuit and forming the active translating components of the system, a normally inactive current-reducing device connected with said semiconducting means for reducing, when active, the current flowing through said semiconducting means to a permissible value, said device having a normally open shunt circuit connected across said semiconducting means, and sensing means responsive to any electric load conditions of said semiconducting means due to cause overheating of said semiconducting means, said sensing device being connected to said device for controlling it to close said shunt circuit upon occurrence of said conditions.

3. An electric current translating system, comprising a load circuit, semiconducting p–n junction rectifier means series-connected in said circuit and forming the active translating components of the system, a normally inactive current-reducing device connected with said semiconducting means for reducing, when active, the current flowing through said semiconducting means to a permissible value, said device comprising a current reductor of normally negligible resistance connected in said load circuit in series with said semiconducting means and having, when active, an electropositive resistance so as to gradually reduce the current in said load circuit, and sensing means responsive to given load conditions of said semiconducting means due to cause overheating of said semiconducting means, said sensing device being connected to said device for controlling it to activate said reductor in response to said conditions.

4. An electric current translating system, comprising a load circuit, semiconducting p–n junction rectifier means series-connected in said circuit and forming the active translating components of the system, a normally inactive current-reducing device connected with said semiconducting means for reducing, when active, the current flowing through said semiconducting means to a permissible value, said device comprising a current reductor having a normally closed switch connected in said load circuit in series with said semiconducting means and having an electropositive resistance member connected across said switch so as to gradually reduce the current in said load circuit upon opening of said switch, and sensing means responsive to given conditions of said load circuit due to cause overloading of said semiconducting means, said sensing device being connected to said device for controlling it to open said switch upon occurrence of said conditions.

5. An electric current translating system, comprising a multi-phase load circuit, a number of semiconducting p–n junction rectifier means series connected in each of the respective phases of said circuit and forming the active translating components of the system, a normally inactive current-reducing device common to all said semiconducting means and connected with said circuit for reducing, when active, the current in all of said semiconducting means, and a number of sensing means individually connected with said respective phases and responsive to given conditions apt to cause overloading of said semiconducting means in each phase, said sensing means being connected to said device for actuating it upon occurrence of said conditions in any one of said phases.

6. A rectifier system, comprising a direct-current output circuit and a multiphase circuit for energizing said output circuit, a number of semiconducting p–n junction rectifier means series connected in each of the respective phases of said multiphase circuit and forming the active translating components of the system, a normally inactive current reducing device for reducing, when active, the current in all of said semiconducting means, a number of first sensing means individually connected with said respective phases and responsive to given conditions apt to cause overloading of said semiconducting means, second sensing means common to all said semiconducting means and responsive to given output conditions apt to cause overloading of said semiconducting means, all of said first and second sensing means being connected to said device for actuating it upon response of any one of said sensing means.

7. A rectifier system according to claim 6, comprising a multiphase transformer having a primary circuit and having secondary windings connected in said respective phases, said current-reducing device being connected in said primary circuit.

8. A rectifier system, comprising a power-supply transformer having a multiphase primary circuit and having a multiphase secondary circuit, a direct-current output circuit connected with all phases of said secondary circuit, a number of semiconducting p–n junction rectifier means series connected in each of the respective phases of said secondary circuit and forming the active translating components of the system, a normally inactive current reducing device connected in said primary circuit for reducing, when active, the current in all said semiconducting means, a number of sensing means connected with the respective phases of said primary circuit and responsive to given conditions apt to cause overheating of said semiconducting means, said sensing means being connected to said device for activating it upon occurrence of said conditions.

9. In a current translating system according to claim 5, said device comprising a normally open short-circuiting switch connected across each individual one of said semiconducting means.

10. In a current translating system according to claim 5, said semiconducting means in each of said phases comprising a group of interconnected semiconductor units, and each of said units having one of said respective sensing means connected thereto.

11. In a current translating system according to claim 1, said sensing means comprising an overload-current responsive member and a reverse-current responsive member in series with said semiconducting means.

12. In a current translating system according to claim 5, said sensing means in each phase comprising a polarized member responsive to flow of reverse current through said semiconducting means.

13. In a current translating system according to claim 5, said sensing means comprising a polarized voltage-responsive member connected to said semiconducting means in each phase and poled for response to breakdown of the blocking voltage of said semiconducting means.

14. A current translating system according to claim 1, comprising a normally closed switch connected with said load circuit, and circuit means connecting said switch with said device for controlling said switch to de-energize said load circuit together with the actuation of said device.

15. A rectifier system according to claim 6, comprising a multiphase transformer having a primary circuit and having secondary windings connected in said respective phases, a normally closed switch series-connected in said primary circuit, and circuit means connecting said switch with said device for controlling said switch to de-energize said transformer when said device is actuated by said sensing means.

References Cited in the file of this patent

UNITED STATES PATENTS

| 2,672,584 | Rolf | Mar. 16, 1954 |
| 2,846,636 | Kleinvogel | Aug. 5, 1958 |
| 2,888,628 | Christian et al. | May 26, 1959 |

FOREIGN PATENTS

| 293,553 | Switzerland | Dec. 16, 1953 |